(12) United States Patent
Harkcom et al.

(10) Patent No.: US 6,511,278 B1
(45) Date of Patent: Jan. 28, 2003

(54) APPARATUS FOR SECURING AN IMPLEMENT TO A TRANSPORTER

(75) Inventors: Melanie W. Harkcom, New Holland, PA (US); Terry A. Young, Lititz, PA (US)

(73) Assignee: New Holland North America, Inc., New Holland, PA (US)

( * ) Notice: Subject to any disclaimer, the term of this patent is extended or adjusted under 35 U.S.C. 154(b) by 4 days.

(21) Appl. No.: 09/909,656

(22) Filed: Jul. 20, 2001

(51) Int. Cl.$^7$ ................................. B60P 1/43; B60P 3/06
(52) U.S. Cl. ......................... 414/470; 414/537; 410/3; 56/228
(58) Field of Search .......................... 414/373, 470, 414/482, 537, 812, 813; 14/71.1; 56/228; 410/2, 3

(56) References Cited

U.S. PATENT DOCUMENTS

| | | | | |
|---|---|---|---|---|
| 2,720,325 A | * | 10/1955 | Kay ........................... 280/80.1 |
| 4,127,856 A | * | 11/1978 | Bickel ......................... 14/71.1 |
| 4,371,299 A | * | 2/1983 | Cain et al. .................. 248/670 |
| 4,553,895 A | * | 11/1985 | Ellis ........................... 14/71.1 |
| 4,607,996 A | | 8/1986 | Koch .......................... 414/537 |
| 4,770,577 A | * | 9/1988 | Farris .......................... 280/789 |
| 4,834,598 A | * | 5/1989 | Bruns .......................... 410/156 |
| 5,529,447 A | * | 6/1996 | Bruns et al. ................. 410/156 |
| 5,975,829 A | | 11/1999 | Walters et al. .............. 414/537 |
| 6,047,989 A | * | 4/2000 | Wood .......................... 280/789 |
| 6,332,746 B1 | * | 12/2001 | Lang et al. .................. 414/491 |
| 6,419,431 B1 | * | 7/2002 | Kuhns ......................... 410/156 |
| 6,428,047 B1 | * | 8/2002 | Kaderabek .................. 280/781 |

* cited by examiner

Primary Examiner—James W. Keenan
(74) Attorney, Agent, or Firm—Larry W. Miller; John William Stader (57) ABSTRACT

The instant invention is directed to method and apparatus for securing an implement to a transporter. The transporter has rigid hooks affixed thereto adjacent the platforms upon which the wheels of the implement rest during transport. The implement has horizontally protruding cross pins that rise as the header on the implement is lowered to the transport position. By directing the wheels of the implement onto the transporter, the cross pins are moved into the mouths of the hooks and then, upon lowering of the implement header, the pins are directed into the throats of the hooks, securing the implement to the transporter.

5 Claims, 11 Drawing Sheets

APPARATUS FOR SECURING AN IMPLEMENT TO A TRANSPORTER

CROSS-REFERENCE TO RELATED APPLICATIONS

This application relates to U.S. patent application Ser. No. 09/909,646 entitled "Apparatus for Raising Ramps on an Implement Transporter"; application Ser. No. 09/909,657 entitled "Ramp Locks for an Implement Transporter"; and application Ser. No. 09/909,655 entitled "Automatic Fold-Up Jack for an Implement Transporter, all filed on Jul. 20, 2001.

FIELD OF THE INVENTION

The instant invention relates generally to transporters for crop harvesting implements, and more particularly to method and apparatus for securing an implement to such a transporter.

BACKGROUND OF THE INVENTION

Generally, harvesting equipment, particularly hay harvesting equipment, has been designed and manufactured with a transverse width that would permit transport thereof over the highway and through farm gates. Although the hay harvesting machines commonly referred to as pivot tongue windrowers, such as those shown in U.S. Pat. No. 4,081,946, granted in 1978 to Philip J. Ehrhart, were generally wider in a transverse direction than previous pull-type hay harvesting machines, the centrally mounted pivoted drawbar permitted towing of the harvester directly behind the tractor in a centrally located position and, therefore, transport of the harvester in a normal operational orientation was possible.

Increasing transverse widths of such harvesting machines, however, prevents harvesters from being towed over the highway and through restrictive openings behind the tractor in a normal orientation, necessitating the provision of alternative means of transport. Two methods of transporting such implements in a transverse orientation are shown in U.S. Pat. Nos. 3,962,853 and 3,721,461. Such apparatus requires a movement of wheels, hitches, jacks, etc. to equip the harvester for movement in a transverse direction, including the disconnection and reconnection of appropriate hitches to the tractor.

The development of the pivot tongue harvester with a laterally extendible drawbar, as disclosed in U.S. Pat. No. 4,558,560, permits the harvester to be mounted on a transporter and transported in a lateral orientation by utilizing the drawbar of the harvester as the hitch connection to the tractor. Such a transporter utilizes transversely extending load ramps to permit the harvester to be elevated from the ground onto the transporter. For example, U.S. Pat. No. 4,607,996, granted to Earl E. Koch in 1986, discloses a transporter developed for carrying an implement of the type including a pivot tongue arched over the crop cutterhead of the implement and pivoted at is rear end to a location midway between the opposing side ends of the wheel-supported frame from which the cutterhead, or header, is suspended. The transporter includes an over-the-center latch adjacent each platform to engage special brackets affixed to the harvester frame to secure the harvester to the transporter. This is a very functional and reliable system; however, it does employ parts and components that are relatively expensive and moderately complex.

Another example of a transporter is U.S. Pat. No. 5,975,829, issued to Walters et al. in 1999. The transporter shown in the '829 patent, while very similar to the Koch patent mentioned above, differs, inter alia, in the method by which the implement is secured to the transporter. In the '829 patent, upwardly facing latch hooks are affixed to the rear of the implement and, after loading onto the transporter, rise into engagement with bumper/latch bars on the transporter as the header is lowered for transport. This system is not quite so complex as the earlier machine, but does require specially bent and formed parts that require more skill and labor to manufacture than those required by the instant invention.

It would be desirable and beneficial to provide an apparatus for securing the implement to the transporter that is simpler to manufacturer and easier to assemble than those used in prior art machines.

SUMMARY OF THE INVENTION

It is an object of this invention to provide an implement transporter that employs simple hooks affixed to the transporter and cross pins on the implement to securely fasten the implement to the transporter.

It is another object of this invention to provide fixed hooks, open toward the ramps, and cross pins on the implement arranged so that the cross pins enter the mouths of the hooks and then fully engage the throats thereof when the header on the implement is lowered to the transport position.

It is a broad object of this invention to provide an improved implement transporter of the type described herein that is reliable and stable in design and simple in construction.

It is a further object of this invention to provide a method for securing an implement to a transporter, the steps of which are simple and easy to follow, and result in a reliable locking of the implement to the transporter time after time.

It is a feature of this invention to provide a method and apparatus for securing an implement to a transporter that does not rely upon complex or expensive to produce components.

It is a still further object of this invention to provide a lateral transporter for carrying a harvesting machine in a transverse orientation that is durable in construction, inexpensive of manufacture, low in maintenance, facile in assemblage, and simple and effective in use.

These and other objects, features and advantages are accomplished according to the instant invention by providing a method and apparatus for securing an implement to a transporter. The transporter has rigid hooks affixed thereto adjacent the platforms upon which the wheels of the implement rest during transport. The implement has horizontally protruding cross pins that rise as the header on the implement is lowered to the transport position. By directing the wheels of the implement onto the transporter platforms, the cross pins are moved into the mouths of the hooks and then, upon lowering of the implement header, the pins are directed into the throats of the hooks, securing the implement to the transporter.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE INVENTION

Figure 1:
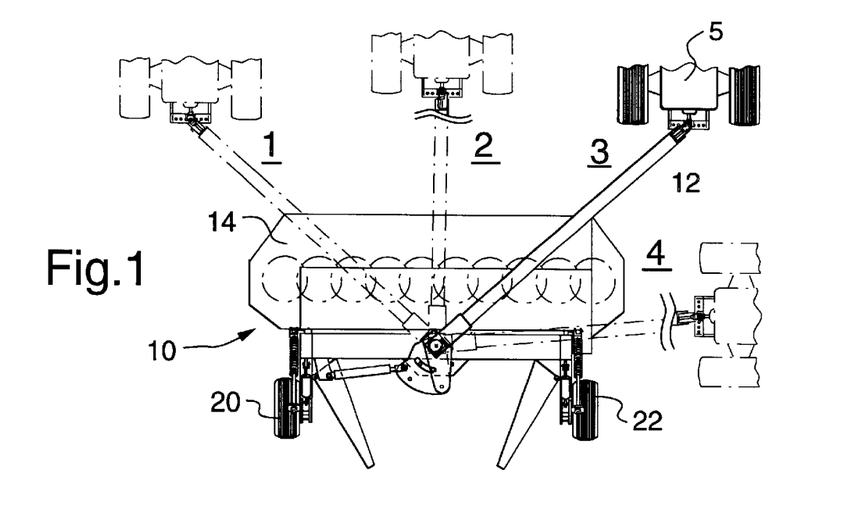
FIG. 1 is a top plan view of the crop harvesting implement of the type to be transported, showing the rear end of a tractor connected thereto, the operative tongue positions and the relative transport positions of the tractor and implement (without the transporter)

Referring now to the drawings, and particularly FIG. 1, a pivot tongue mower-conditioner 10 suitable for use with the transporter of the instant invention is shown. As discussed above in the BACKGROUND OF THE INVENTION, this is a well-known hay harvester and includes, in pertinent part, a centrally mounted pivot tongue 12 connected to tractor 5, a header 14 (see FIGS. 5 through 9) with a cutterbar 16, conditioner rolls 18 and support wheels 20 and 22. The mower-conditioner may be operated in any of the three positions shown in FIG. 1 as 1, 2 and 3. For purposes of clarity, FIG. 1 also shows the tractor 5 in the lateral position 4, which is the position it would be in for pulling the implement after loading onto the transporter.

Figure 2:
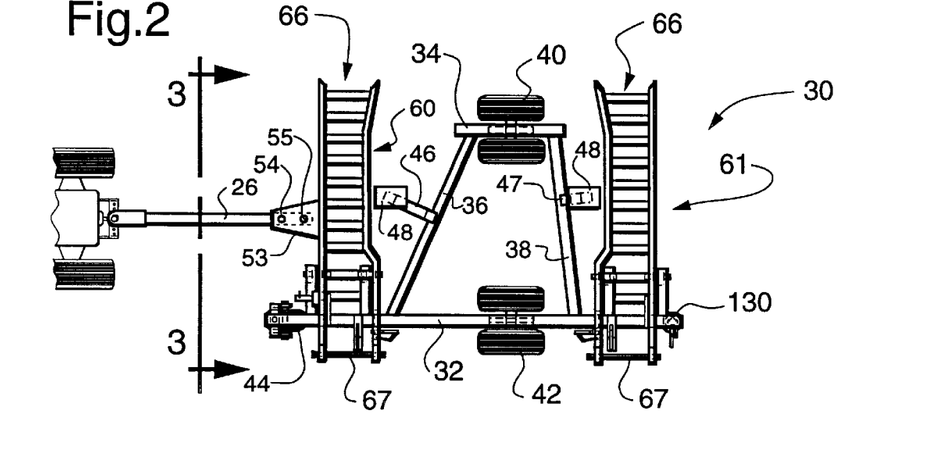
FIG. 2 is a top plan view of the transporter of the instant invention and a tractor attached for empty towing of the transporter.
Figure 3:
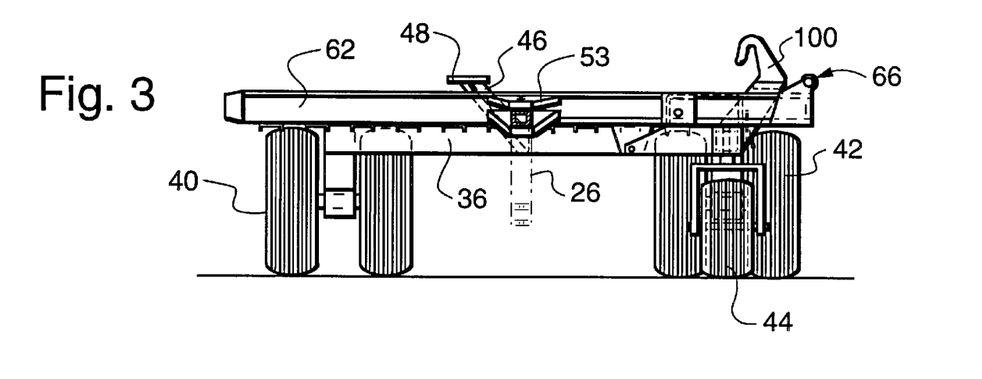
FIG. 3 is a front elevation view of the transporter (relative to the normal empty towing direction) to a larger scale than FIG. 2 and taken on the line 3—3 of FIG. 2.
Figure 4:
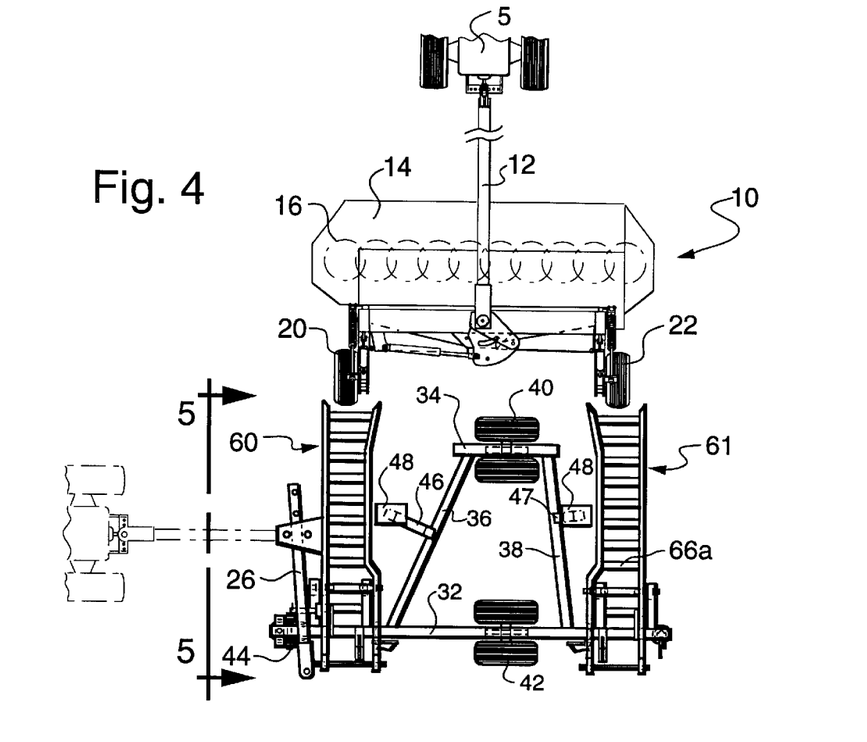
FIG. 4 is a top plan view of the implement and tractor preparing to back the implement onto the transporter; the removable tongue of the transporter has been moved to its storage position adjacent the rearmost ramp.
Figure 5:
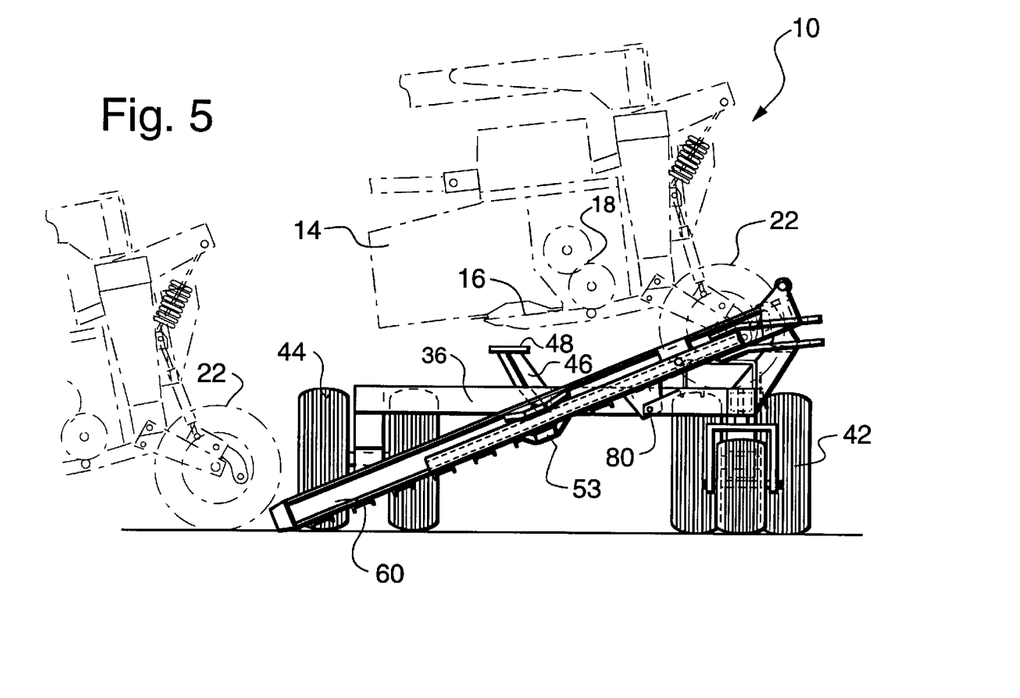
FIG. 5 is an enlarged front elevation view taken on the line 5—5 of FIG. 4 showing (in phantom) the implement approaching the ramps and after it has been moved off the ramps onto the platform, ready to raise the ramps.
Figure 6:
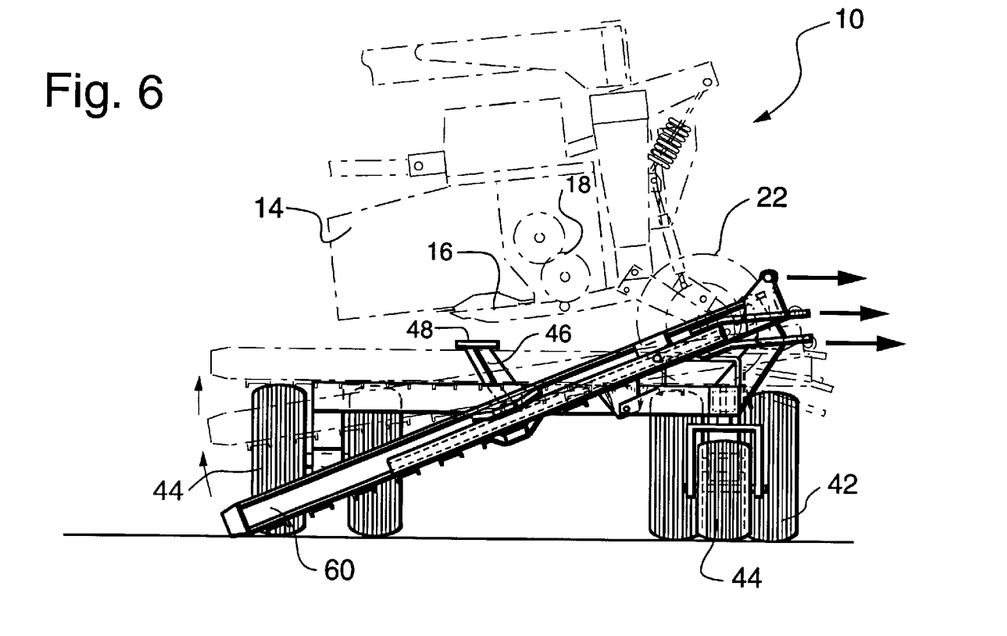
FIG. 6 is a front elevation view of the transporter, similar to FIG. 5, indicating how further backing motion of the implement after it has moved off the ramps onto the platform affects raising of the ramps from the solid line (ground-engaging) position to the final phantom line (transport) position.
Figure 7:
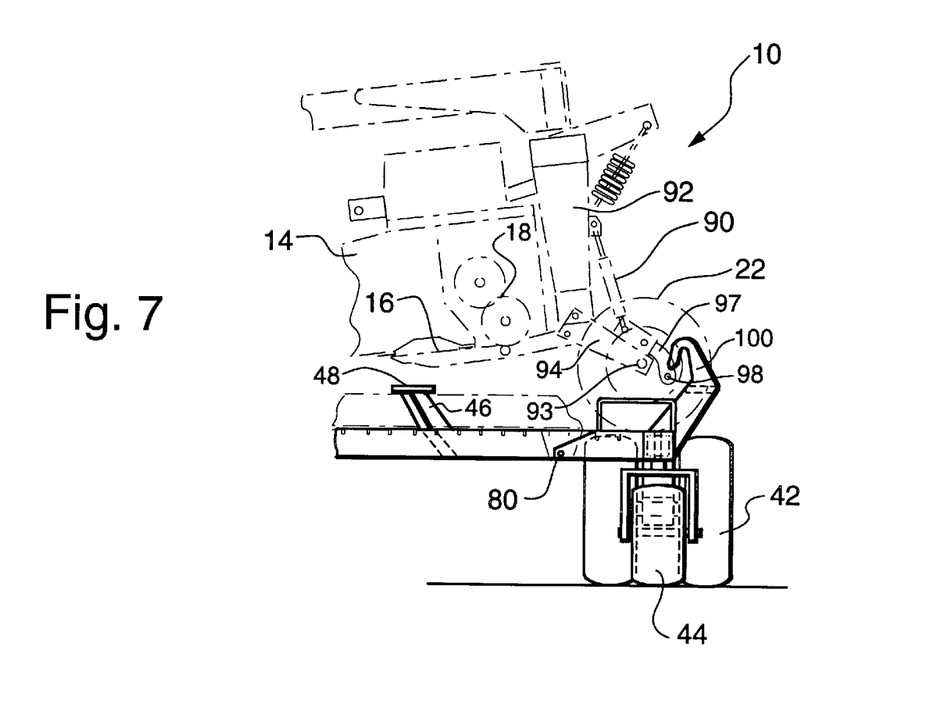
FIG. 7 is a fragmentary elevation view, similar to FIG. 6, but with parts broken away to better reveal the relationship of the disclosed cross pins of the implement with the securing hooks of the transporter frame (lift cylinder extended)
Figure 8:
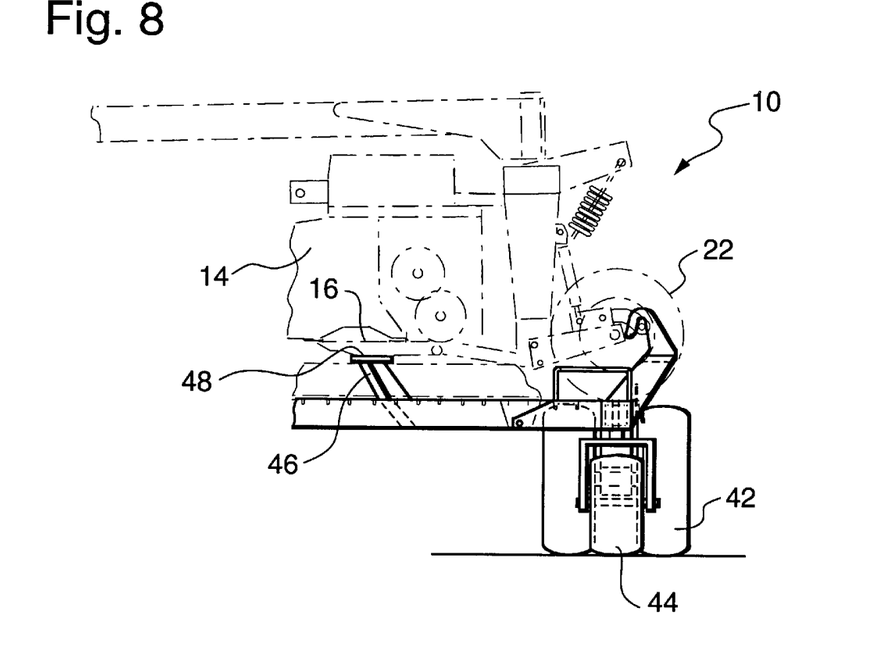
FIG. 8 is a view, like FIG. 7, but with the implement lift cylinder retracted from the FIG. 7 position to cause the implement to lower onto the platform and elevate the cross pins into the throats of the securing hooks while lowering the implement header onto the support plates.
Figure 9:
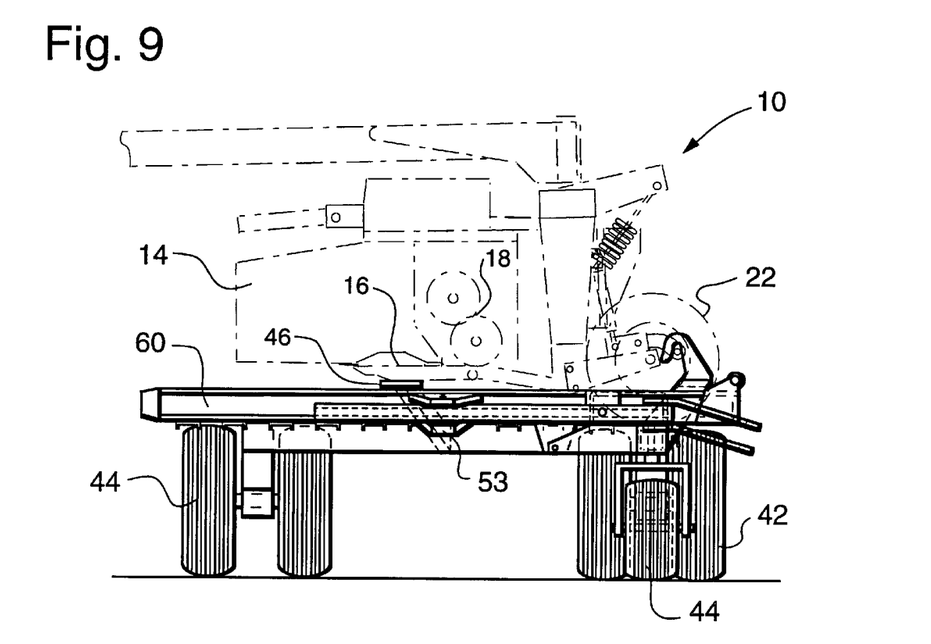
FIG. 9 is a rear elevation view, like FIGS. 5 and 6, with the implement in the full transport position.

Since the drawbar, or tongue, of the implement is used to pull the load during the transport mode, some other arrangement has to be made for empty movement. FIG. 2 shows the transporter ready for movement without a loaded implement. For purposes of understanding, reference will be made herein to the "forward" and "rearward", "front" and "rear" directions. Forward is the direction of travel of the transporter when loaded, which would be to the right in FIG. 2. Reverse is the opposite direction, or the direction that the transporter is moved when unloaded. A secondary tongue 26 attaches to a yoke 53 on the rearmost ramp 60 by pins or bolts 54 and 55. Tongue 26 has a storage location on the transporter that can be seen in FIG. 4, where it is safely secured when not in use. Note that when moving the transporter without the implement, secondary tongue 26 is attached such that the direction of travel is the opposite of that when loaded.

Figure 13:
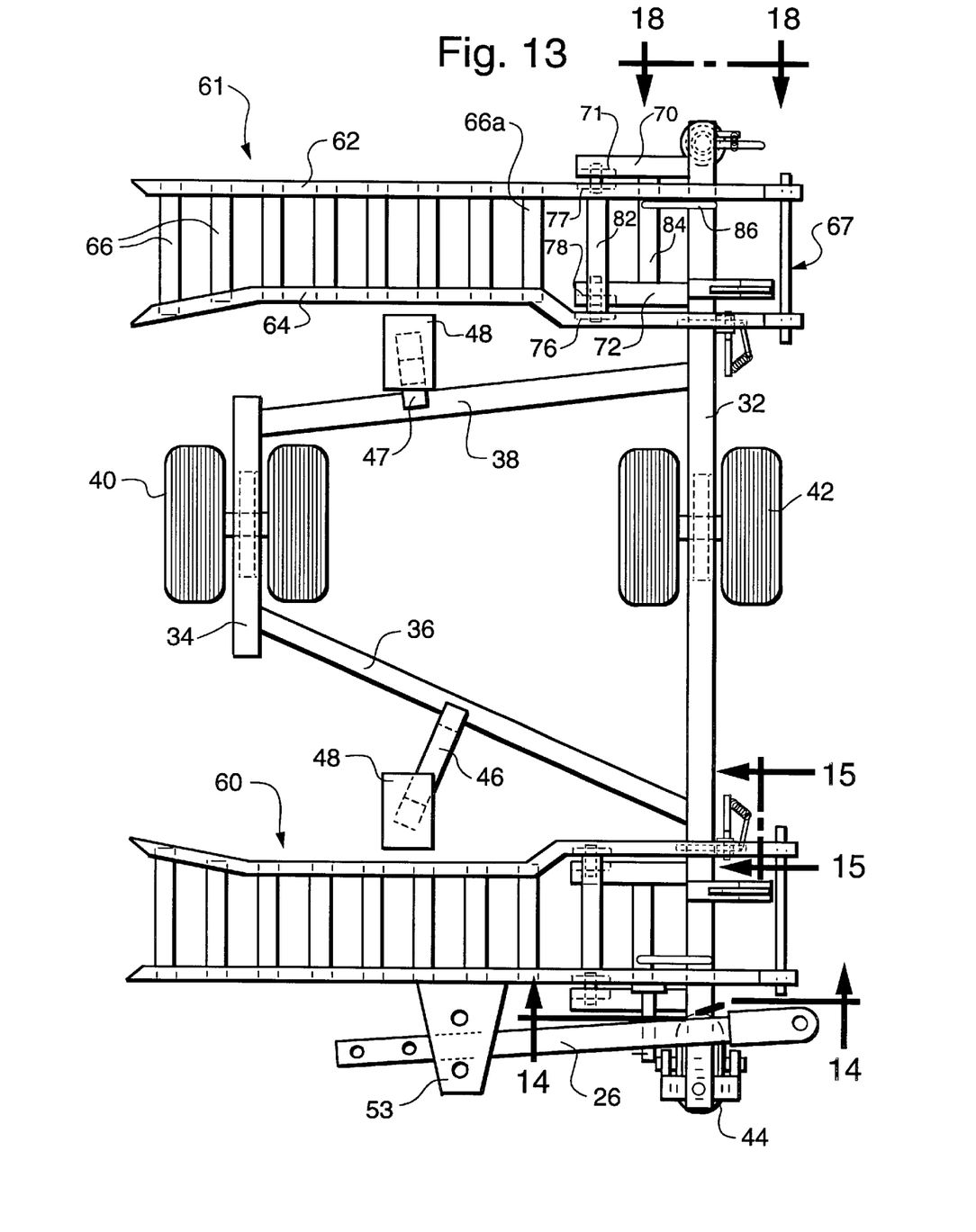
FIG. 13 is an enlarged plan view of the transporter alone in the mode illustrated in FIG. 12.
Figure 14:
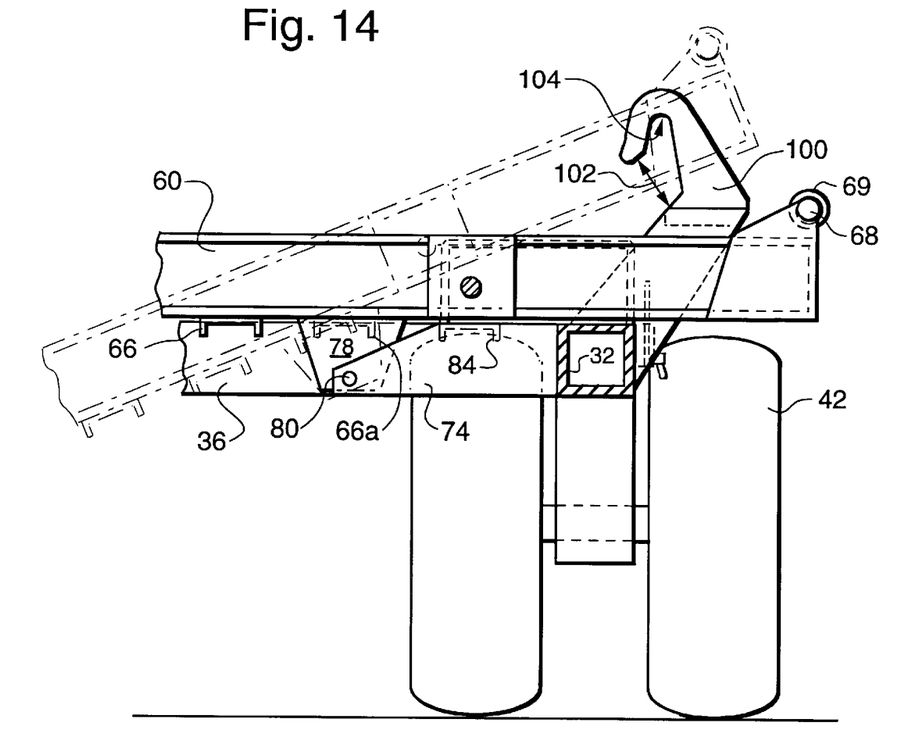
FIG. 14 is an enlarged detail view taken on the line 14—14 of FIG. 13 showing the ramp and main frame structure in the area where the implement wheel moves from the ramp onto the platform.

Referring again to FIG. 2, and to FIG. 13, the basic transporter 30 can be seen to comprise a main frame that includes a longitudinal box beam 32, a shorter longitudinal box beam 34 held in spaced apart relation to beam 32 by two additional generally transverse box beams 36 and 38. The main frame is supported for movement by wheel sets 40 and 42 (in both cases, only one reference number is used to designate the wheel pair), though single wheels would also provide the adequate support, however, perhaps without the desired load carrying capabilities, especially in wet, muddy field conditions often encountered on the farm. As can be seen more dearly in other figures, a caster wheel 44 is attached to beam 32 at the rear end thereof for additional support during loading and unloading and for assistance in moving the implement tongue 12 from the loading to the transport position. Caster wheel 44 is in common usage and standard construction and style.

A pair of ramps, 60 and 61, are pivotably attached to the main frame, as will be discussed in more detail further below. Attached to the transverse beams 36 and 38, and extending above the level of the raised ramps, are two header supports. These supports are comprised of beams 46 and 47 and generally flat support plates 48 and 49. When the header 14 of implement 10 is lowered for transport, as will also be discussed further below, the header rests on these support plates.

Referring now to FIGS. 3 through 5, 13 and 14, the operation of the ramps will be described. During the loading operation, the implement is pushed by the tractor up the ramps onto a platform, after which continued pushing by the tractor results in the ramps being raised from the loading position to the transport position. More specifically, a pair of independently movable ramps, 60 and 61, pivot between a loading position where one end of the ramp is in contact with the ground and a transport position where the ramps are in a generally horizontal position. Perhaps as best seen in FIG. 13, ramps 60 and 61 are generally mirror images of each other (so a description of one is applicable to the other). They are each comprised of two lateral C-shaped channels, 62 and 64, which are side members for a plurality of support members 66 that extend between the two side members part way along the length thereof, stopping at the support 66*a*. Thereafter, the distance between the two side members is increased slightly when member 64 takes a jog inwardly. A cross bar 67 interconnects the upper ends of side members 62 and 64. As can best be seen in FIG. 14, cross bar 67 is comprised of a rod 68 enclosed in loosely fitting tube 69.

Affixed to beam 32 are a pair of platform supports, 70 and 72, that extend transversely from beam 32. On the underside of each of these supports is a flange, 74 and 76, that is pivotably pinned to a matching flange, 77 and 78, on the side members 62 and 64 of the ramp. Thus, the ramps pivot vertically about pivot point 80 between the loading and transport positions.

Extending between the platform supports 70 and 72 are platform braces 82 and 84 which, together with the top of beam 32 form a platform to support the wheels of the implement during transport. There is additionally provided a small wheel guide 86 that assures proper placement of the wheel during loading and unloading and additionally prevents the tires from rubbing against frame members, impeding pivoting of the ramps.

Thus, in loading, the implement is put into the raised position (header up) and the tractor backs the implement wheels onto support member 66 of ramps 60 and 61. When the tires pass over support member 66*a*, they move off the ramps and onto the platform made up of platform braces 82 and 84 and beam 32. As the tractor continues to push the implement onto the transporter, the tires come into contact with cross bar 67 where, as can perhaps best be seen in FIGS. 5 and 6, the rearward force causes the ramps to pivot upwardly and into the transport position because the cross bar is located above the pivot point 80 of the ramp. The tires contact the loose fitting tube 69 of cross bar 67 and may spin or rotate tube 69 as they force the ramp into the transport position. In this way, the tires do not grip the cross bar and resist the pivoting of the ramp.

Referring to FIGS. 6 through 9, the locking of the implement to the transporter will be described. Looking at the phantom partial showing of the implement in FIG. 7, it can be seen that the header 14 is raised and lowered through the action of hydraulic cylinder 90. Wheel 22 (and this is true of the other end of the implement also as both sides of the implement are similar in construction and operate off of a single hydraulic system) is attached at its axis 93 to implement frame 92 by a wheel arm 94. With wheel arm 94 pivotally attached to frame 92 at pivot point 96, cylinder 90 works to either raise or lower the frame, and thus the header, relative to the ground. Affixed to the wheel arm 94 is a latch 97 that includes at one end there of a cross pin 98 that extends between the two side plates of latch 97 on an axis parallel to that of the spindle of wheel 22. There is rigidly affixed at each end of beam 32, adjacent the platforms a hook 100 (most clearly seen in FIG. 14) that includes a mouth 102, opening generally downwardly and toward the platform, and a throat 104. The physical arrangement between cross bar 67, hook 100, cross pin 98 and wheel 22 is such that during the loading operation, the wheel 22 comes into contact with cross bar 67 at approximately the same time that cross pin 98 approaches the mouth of hook 100. As the tractor forces the implement back against the cross bar 67, the pin 98 enters the mouth of hook 100. Then, cylinder 90 is contracted, lowering the header and raising cross pin 98 solidly into the throat of hook 100, securing the implement on the transporter. At that same time, the wheels are pulled tightly against the cross bar, solidly holding the ramps in the transport position.

FIGS. 13 through 17 show, inter alia, the locks for securing the ramps in the raised position when moving the empty transporter. There are separate and generally identical locks on each ramp, only one of which will be described. The lock has two basic positions that are manually set by the operator—an unlocked position where the ramp is free to move between the loading and transport positions, and the locking position where the ramp is either locked in the transport position or movable into the locked position.

Figure 17:
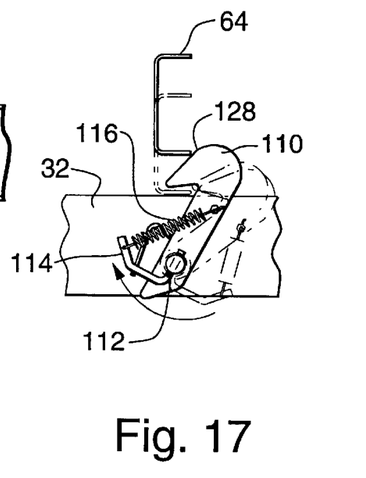
FIG. 17 is a view similar to FIG. 15, with the selection arm thrown over to the locking position.
Figure 18:
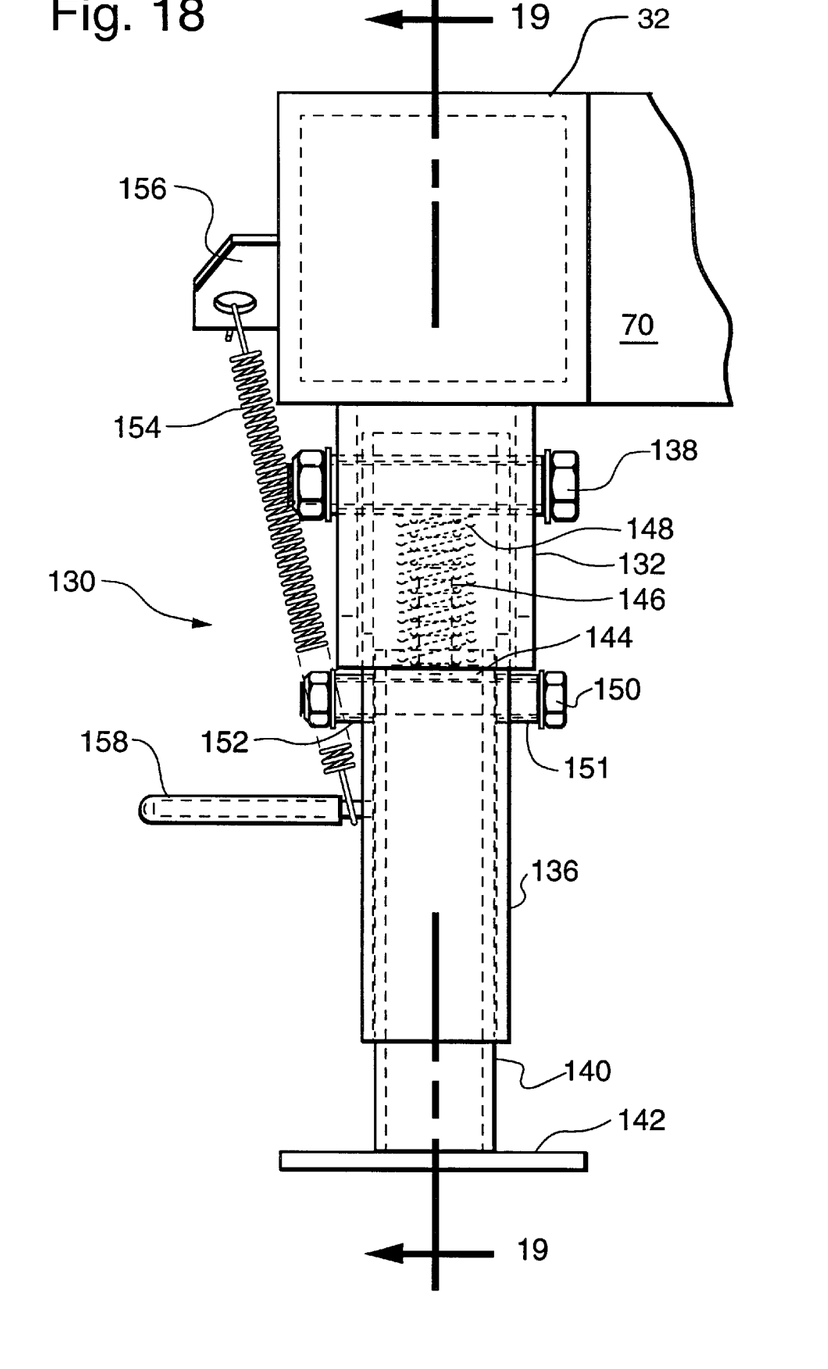
FIG. 18 is a vertical elevation view taken on the line 18—18 of FIG. 13 showing the fold-up jack drawn to an enlarged scale.

The lock itself is comprised of a latch 110 pivotally affixed to beam 32 by pin 112 that extends through latch 110. Spacer 113 holds the latch and other mechanisms a small distance away from beam 32 to help prevent the build up of debris that could interfere with operation. An angular selection arm 114 extends through a hole in pin 112 and is pivotable approximately 180° relative to the plane of the latch. Pin 112 also serves as a fastener to hold the latch, pin, spacer, and selection arm structure together. A tension spring 116 is attached at to latch 110 at point 118 and to the selection arm at point 120. Since the relative positions of attachment points 118, 120 and pin 112 (pivot point for latch 110) can be changed by pivoting selection arm 114 between the two positions shown in FIG. 17, the spring and selection arm are in reality an over-the-center mechanism that will bias latch 110 into the two positions—unlocked and locking. A stop 122, in the form of an angled plate is affixed to the beam 32 to stop the latch at a selected maximum open position, as shown in FIG. 15, and a maximum closed position, as shown in FIG. 17.

Figures 15, 16:
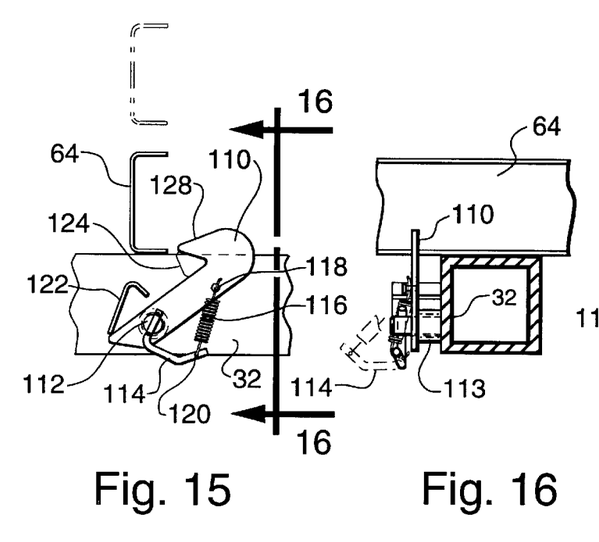
FIG. 15 is a fragmentary elevation view of the ramp latch mechanism taken on the line 15—15 of FIG. 13.
FIG. 16 is a view of the structure of FIG. 15 taken at the right angle thereto as shown by the line 16—16 of FIG. 15.

In FIG. 15, side member 64 of the ramp is shown solid in the transport position and the loading position in phantom. Latch 110 is shown in this figure to be in unlocked position, i.e., selection arm 114 is pivoted to the right and the over-the-center mechanism is biasing the latch into the unlocked position and in contact with stop 122—the latch will not lock onto member 64, so the ramp is free to move between the loading and transport positions. In FIG. 17 the selection arm 114 has been moved manually by the operator 180° from that shown in FIG. 15 and latch 110 is biased toward the locking position. The angled leg of stop 122 is in contact with latch 110. As the ramp is raised, it locks under the latch 110 as shown in phantom in this figure.

Latch 110 has a hook-shaped mouth 124 open toward the point at which member 64 contacts the top surface of beam 32. The surface of latch 110 closest to the path of movement of member 64, adjacent to mouth 124, is an inclined surface 128 which, when contacted by member 64 as it moves toward the raised position (downwardly in this figure), will serve to push the latch clockwise, as viewed in FIG. 17, toward the unlocked position; however, since the over-the-center mechanism is biasing the latch to the locked position, the latch will merely move clockwise until member 64 clears the edge of mouth 124, and then spring back to the locked position, securing the ramp in the transport position.

During the loading process it is possible to encounter difficulties with balance, so it is advantageous to have a support at each end of the transporter. At one end of the frame member 32 there is a caster wheel, as described above, and at the other end there is provided a fold-up jack 130 that can best be seen in FIGS. 18 through 21. Jack 130 is comprised of three primary elements—a bracket to affix it to the transporter, a telescoping ground-engaging member and an over-the-center mechanism to bias the ground-engaging member into either the up or down position.

More specifically, there is provided a three-sided channel shaped bracket 132, with the open side facing the rearward direction. The opposing lower edges of the bracket have formed therein opposing notches 134. An outer tube 136 is pivotally affixed to the bracket by bolt 138 for movement through the open side of the bracket between the down, ground-engaging position and the up disengaged position. An inner tube 140 is telescopically and movably fitted within the outer tube 136. On the lower end of inner tube 140 is a ground-engaging foot 142, while on the other end is a stop 144 affixed near the end of the tube and rigidly supporting a guide rod 146. Fitted around the guide rod 146 is a pair of concentric compression springs 148 that extend between the stop 144 and bolt 138 to bias the two tubes apart, i.e., bias the inner tube longitudinally away from bolt 138. An additional bolt 150, with spacers 151 and 152 thereon, extends through the inner tube in a position to engage the notches 134 in bracket 132. The holes in outer tube 136 through which bolt 150 extends are actually longitudinal slots that allow adequate longitudinal movement of bolt 150 to engage and disengage spacers 151 and 152 with notches 134. A tension spring 154 is connected at one end to flange 156 and at the other end to handle 158. The relationship between the connection points of spring 154 and the pivot point 138 of outer tube 136 establish an over-the-center mechanism that will bias the two tubes either in the down position or the up position.

Figure 10:
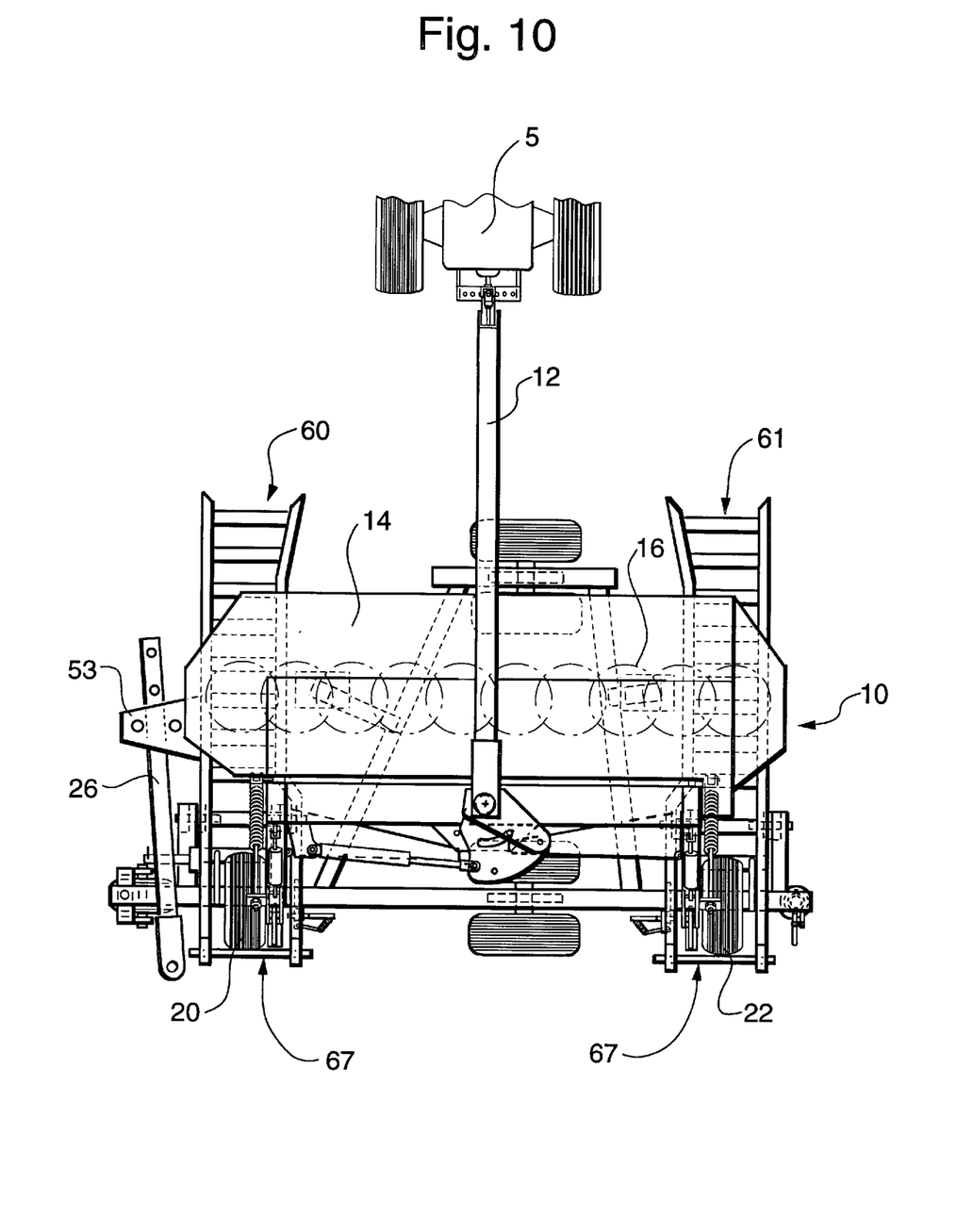
FIG. 10 is a top plan view of the tractor, implement and transporter assembly in the loaded and secured mode of FIG. 9.
Figure 11:
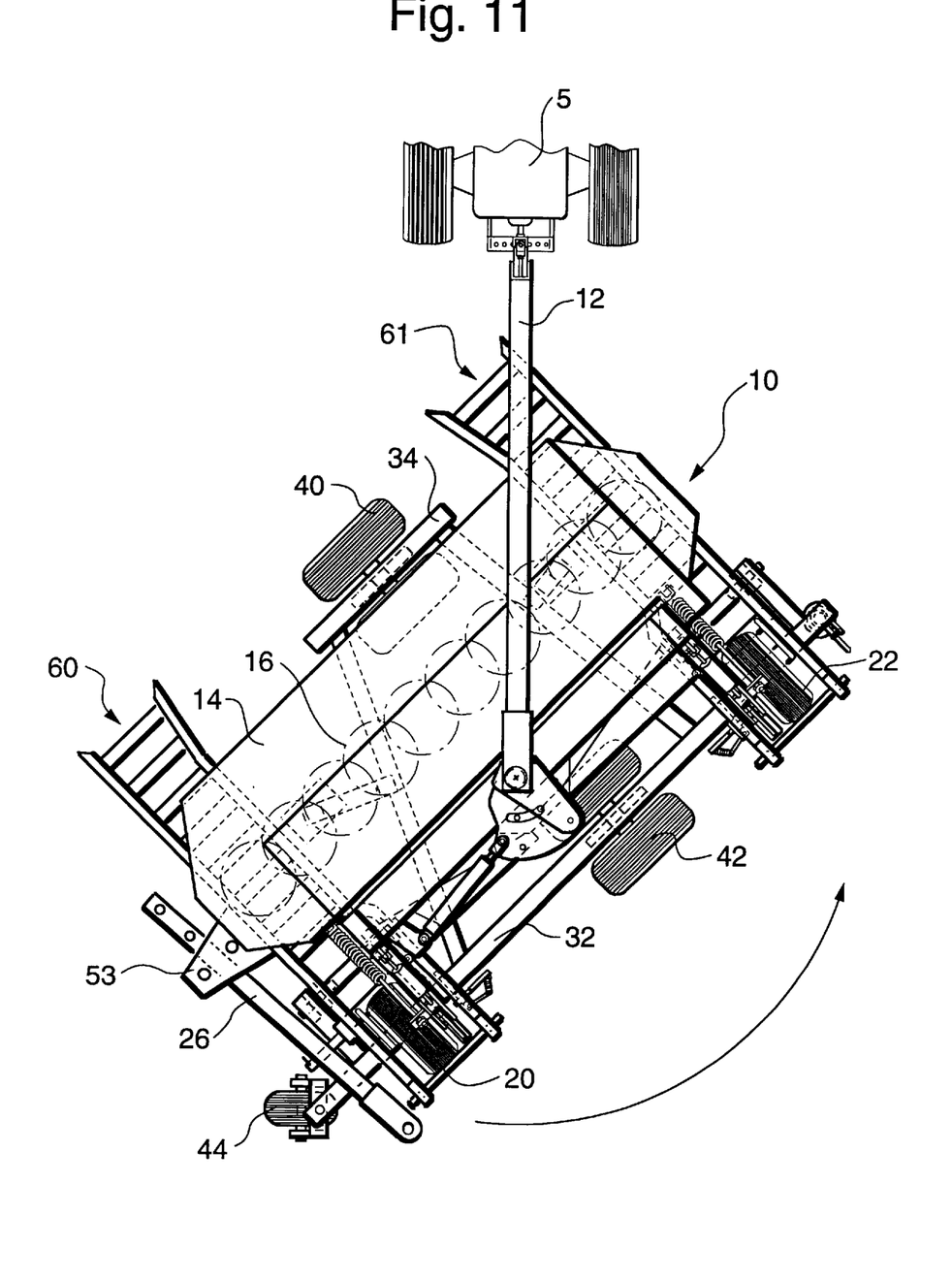
FIGS. 11 and 12 are sequential plan views of the assembly of FIG. 10 showing the loaded transporter being oriented from loading position to towing position relative to the tractor by manipulation of the implement tongue pivoting cylinder.
Figure 12:
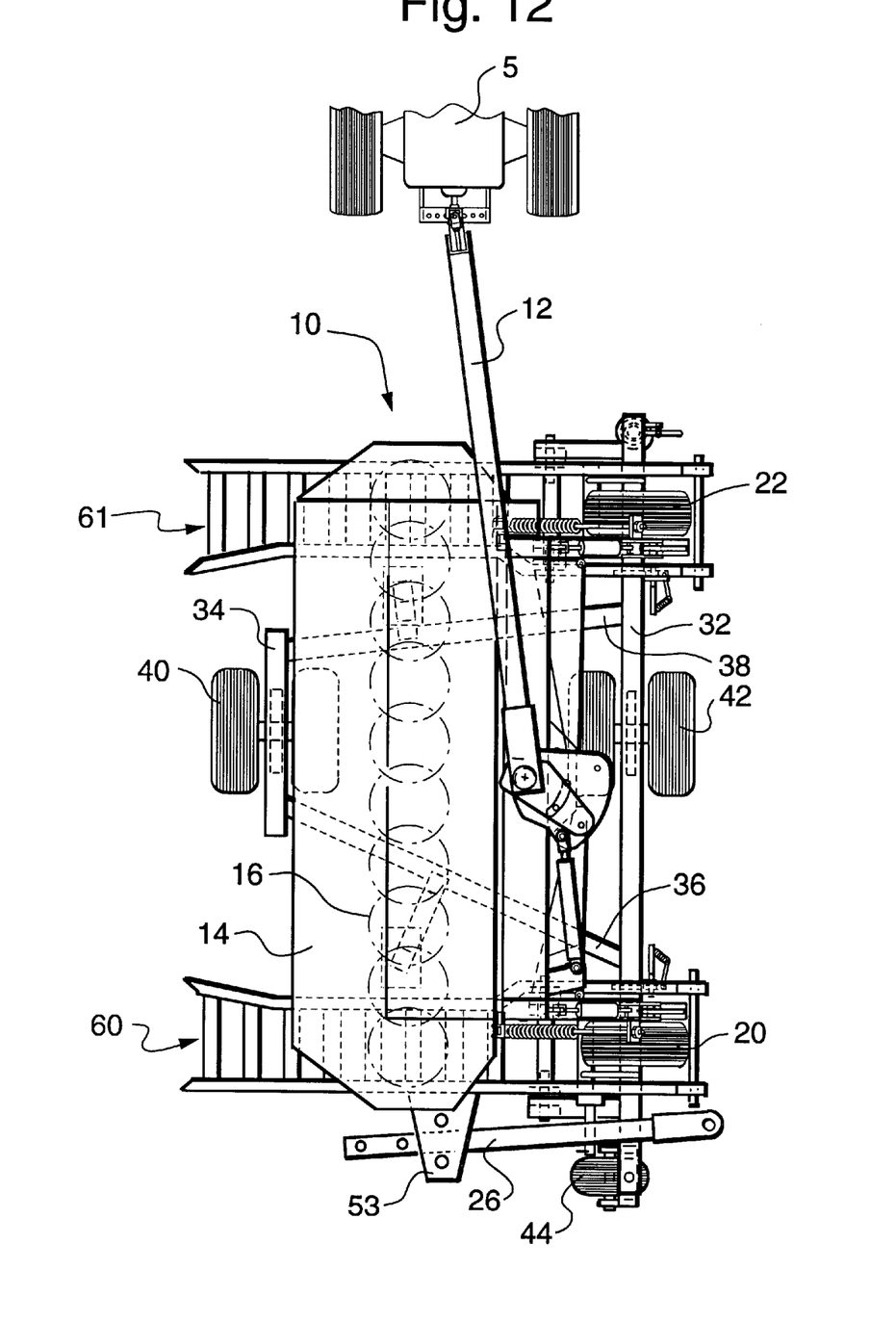
Figure 19:
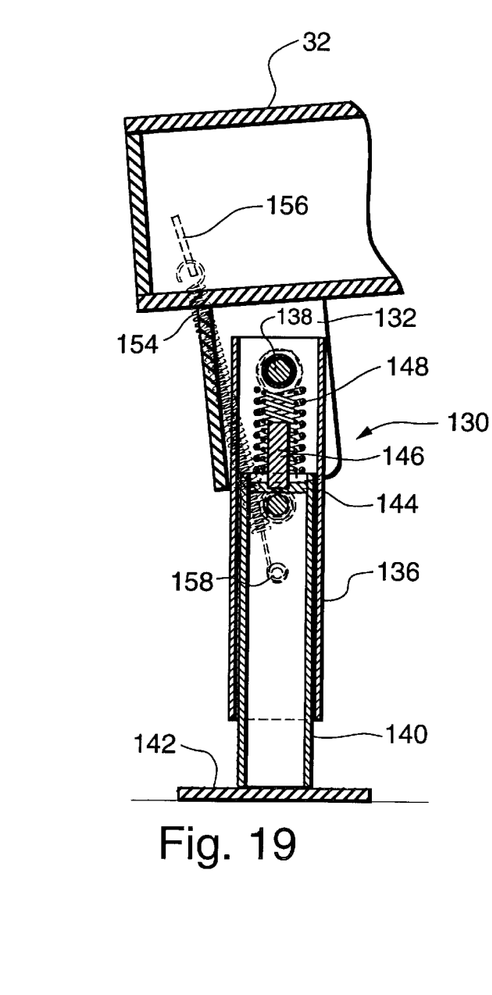
FIG. 19 is a vertical sectional view of the jack taken on the line 19—19 of FIG. 18.
Figure 20:
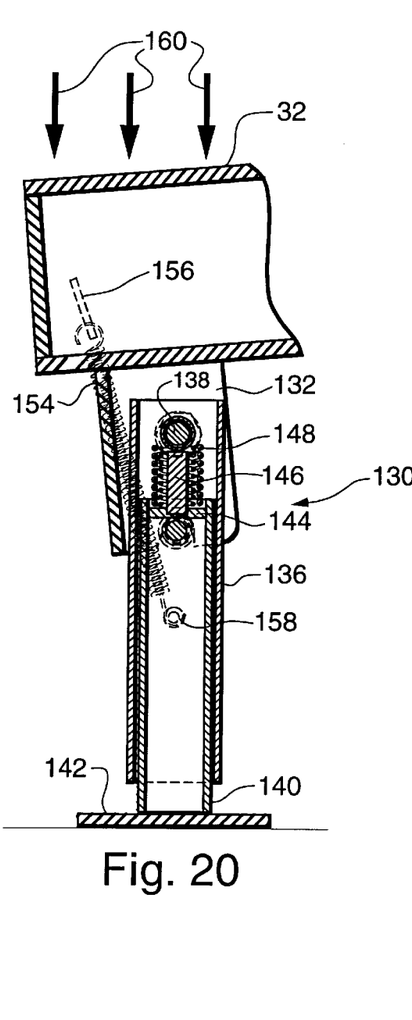
FIG. 20 is a view similar to FIG. 19, but showing the jack parts in locked condition when the main frame is under downward loading.
Figure 21:
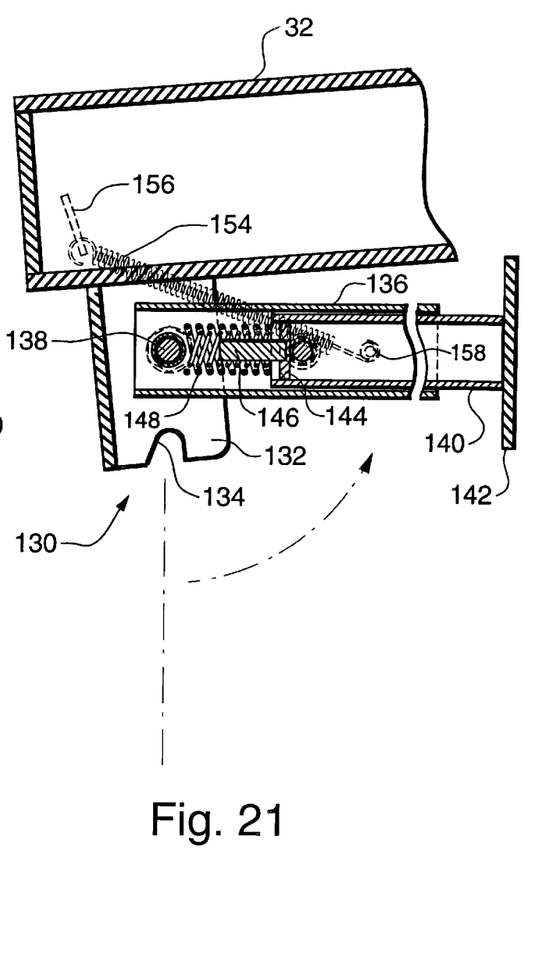
FIG. 21 is a view similar to FIGS. 19 and 20 with the weight load removed from the main frame, as in FIG. 19, and the jack stand swung upwardly in response to forward transport of the implement and contact with the ground or any object on the ground.

In operation, before loading the implement onto the transporter, the operator will move jack 130 into the ground-engaging position, shown in FIG. 19, with handle 158. In this position, spring 154 holds jack 130 in the down position for potential ground engagement. The implement is then backed onto the transporter as shown in FIG. 10, causing the wheels to engage the cross bars, raising the ramps to the transport position and securing the ramps in position. The implement is lowered and cross pins 98 move into the throat of hook 100, securing the implement to the transporter. The end-to-end location of the ramps are such that, when loaded with the implement tongue straight in front of the implement, the weight of the implement will tip the transporter frame toward the castor wheel 44. As the operator swings the transporter around to the transverse position as shown in FIGS. 11 and 12, the castor wheel 44 rolls on the ground, thus preventing turf damage (damage to the ground).

In the full transport position, the weight of the implement comes off the castor wheel and the transporter tips the other direction, thus raising the castor wheel to clear the ground for transporting.

It is possible to load the implement with the tongue extending to the left of the implement instead of in the straight-ahead position as recommended. If this happens, the weight of the implement will tip the transporter toward the end opposite the castor wheel. The jack 130 is provided to support this end of the transporter until the operator can swing the tongue to a straight-ahead position, or extending to the right of the implement such that the weight shifts onto the castor wheel.

When under load, the tube 136 overcomes the force of the internal springs 148, and forces the bolt 150 into the notches 134 of the bracket 132, thus preventing the jack from folding up into its raised position.

When the weight comes off of the jack, the inner tube will be pushed back out by the force of springs 148 and the spacers will slide back down out of the notches 134, thus freeing the jack to pivot back up to the retracted position as the transporter moves forward and the jack contacts the ground or a bump or other fixed object. The preload on springs 148 prevents the inner tube from sliding back up into the notches when it encounters an obstacle. Properly set, very little horizontal force is required to pivot the jack into its raised position compared to the vertical force required to overcome the spring force.

It will be understood that changes in the details, materials, steps and arrangements of parts, which have been described and illustrated to explain the nature of the invention will occur to and may be made by those skilled in the art upon a reading of this disclosure within the principles of the scope of the invention. The foregoing description illustrates the preferred embodiment of the invention; however, concepts, as based upon the description may be employed in other embodiments without departing from the scope of the invention. Accordingly, the following claims are intended to protect the invention broadly, as well as in the specific form shown.

Having thus described the invention, what is claimed is:

1. A transporter for an implement and attached header, the implement having spaced apart generally axially aligned wheels, said transporter comprising:

a main frame having first and second spaced apart, horizontal and generally parallel frame members with ground-engaging wheels affixed thereto and supporting said frame members for movement in either forward or opposing reverse directions of travel; said first and second frame members having a first end toward said forward direction and a second end toward said reverse direction; a third frame member interconnecting said first and second frame members;

said first frame member including a pair of platforms, generally horizontally aligned and spaced apart a distance approximately equal to the spacing between the wheels of the implement; each said platform having a first edge closer to said second frame member and an opposing second edge generally parallel with said first frame member;

first and second elongate parallel ramps pivotally supported by said first frame member and extending away therefrom toward said second frame member in a direction generally transverse to said forward direction; each said ramp having a first end adjacent a respective one of said pair of platforms and a second opposite remote end, the pivot point with said first frame member being located along the length of said ramp such that said second end is heavier than said first end and thus said second end is normally biased toward engagement with the ground;

each said ramp further being free to pivot between a loading position where respective second ends thereof are engaged with the ground and a transport position where said respective second ends are elevated from ground engagement;

each said ramp further including a wheel support extending generally from said second end thereof and ending at said first edge of the respective platform, whereby the implement may be pushed up said ramps on said wheel support and onto said platforms without causing said ramps to pivot to said transport position;

each said ramp further including a cross bar at the first end thereof extending across the respective platforms, said cross bar being at least equal in height above the respective platform with the axle of the wheels of the implement when in said transport position and located relative to said pivot point such that horizontal forces exerted by the wheels of the implement on the cross bar cause the ramp to pivot into said transport position;

a pair of rigid hooks affixed to said first frame member one adjacent each said platform and having a mouth open toward said ramps and a throat; and said implement includes a frame and two axially aligned wheels, each mounted on an axle affixed to a wheel arm that is pivotally attached to said implement frame; hydraulic cylinders interconnecting said implement frame and each said wheel arm such that extension of said cylinders causes the implement frame to raise, and contraction of said cylinders causes said implement frame to lower; a pair of latches, one affixed to each wheel arm and including a cross pin, each cross pin having an axis parallel to, but spaced apart from that of said wheels;

whereby as the implement is pushed up said ramps and onto said platforms said cross pins engage the mouths of said hooks, and lowering of said implement frame causes said cross pins to move upwardly to fully engage said throats of said hooks, securing the implement to the transporter.

2. The transporter of claim 1, wherein:

said cross bar comprises a rod with a loose-fitting tube thereon, such that the tires of the implement may rotate in contact with said cross bar without making a firm grip on said cross bar;

said ground-engaging wheels include wheels on each of said first and second frame members; and said second frame member and the wheels thereon fit between said pair of ramps.

3. The transporter of claim 2, further including:

a fourth frame member interconnecting said first and second frame members; and each said third and fourth frame members includes a header support for engagement with the header on said implement when in said transport position.

4. The transporter of claim 3, wherein:

said wheels on said first and second frame members are axially aligned with each other; and a caster wheel is attached to said first frame member adjacent said second end thereof.

5. The transporter of claim 4, further including:

a removable tongue attachable to said ramp closest to said second end of said first frame member for pulling the transporter without an implement thereon and with said ramps in said transport position.

* * * * *